(12) United States Patent
Peng et al.

(10) Patent No.: US 7,959,889 B2
(45) Date of Patent: Jun. 14, 2011

(54) CARBON MICROTUBES

(75) Inventors: Huisheng Peng, Shanghai (CN);
Yuntian Theodore Zhu, Cary, NC (US);
Dean E. Peterson, Los Alamos, NM (US); Quanxi Jia, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 381 days.

(21) Appl. No.: 12/221,886

(22) Filed: Aug. 6, 2008

(65) Prior Publication Data

US 2010/0035019 A1    Feb. 11, 2010

(51) Int. Cl.
*D01F 9/12*    (2006.01)
(52) U.S. Cl. .................... 423/447.2; 428/367
(58) Field of Classification Search ............. 423/447.2; 428/367
See application file for complete search history.

(56) References Cited

U.S. PATENT DOCUMENTS

| 5,149,517 A * | 9/1992 | Fain et al. ............... 423/447.2 |
| 5,374,414 A * | 12/1994 | Morrish et al. ............ 423/446 |
| 6,221,489 B1 * | 4/2001 | Morita et al. .............. 428/367 |

\* cited by examiner

*Primary Examiner* — Stuart Hendrickson
(74) *Attorney, Agent, or Firm* — Juliet A. Jones; Samuel L. Borkowsky

(57) ABSTRACT

A carbon microtube comprising a hollow, substantially tubular structure having a porous wall, wherein the microtube has a diameter of from about 10 μm to about 150 μm, and a density of less than 20 mg/cm$^3$. Also described is a carbon microtube, having a diameter of at least 10 μm and comprising a hollow, substantially tubular structure having a porous wall, wherein the porous wall comprises a plurality of voids, said voids substantially parallel to the length of the microtube, and defined by an inner surface, an outer surface, and a shared surface separating two adjacent voids.

19 Claims, 4 Drawing Sheets

CARBON MICROTUBES

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD OF THE INVENTION

The present invention relates to tubular carbon structures having an average diameter of at least 10 µm and a characteristic structure within the wall of the tube. The structures have a density of less than 20 mg/cm$^3$.

BACKGROUND OF THE INVENTION

In addition to more conventional forms of carbon such as graphite and diamond, other forms of carbon include fullerenes, carbon nanotubes (CNTs), and carbon nanofoams. Carbon nanotubes may be understood to refer to an elongated hollow structure having a diameter less than 1 µm. Applicants have produced a tubular carbon structure, herein referred to as "carbon microtubes," having an average diameter of at least 10 µm, and a wall which has a structure characterized by rectangular voids extending parallel to the central axis of the tube. Applicants have found that this unique structure results in a number of desirable properties which are superior to other forms of carbon, including low density (comparable to that of nanofoams), high strength, excellent ductility, and high conductivity. These properties indicate a potential for a variety of advanced applications. For example, the diameter and the length of carbon microtubes are comparable to cotton fibers, and yet carbon microtubes may be over 200 times stronger than cotton fibers. Therefore, conventional textile technologies may be used to make carbon microtube fabrics suitable for applications such as body armor and other applications requiring lightweight, high strength composite structures.

SUMMARY OF THE INVENTION

The following describe some non-limiting embodiments of the present invention.

According to one embodiment, the present invention provides a carbon microtube comprising a hollow, substantially tubular structure having a porous wall, wherein the microtube has a diameter of from about 10 µm to about 150 µm, and a density of less than 20 mg/cm$^3$.

According to a second embodiment of the present invention, a carbon microtube is provided, having a diameter of at least 10 µm and comprising a hollow, substantially tubular structure having a porous wall, wherein the porous wall comprises a plurality of voids, said voids substantially parallel to the length of the microtube, and defined by an inner surface, an outer surface, and a shared surface separating two adjacent voids.

BRIEF DESCRIPTION OF THE DRAWINGS

FIG. 1a shows carbon microtubes grown for 30 min. and FIG. 1b shows carbon microtubes grown for about 3 hours.

FIG. 2a depicts an angular view of the entire carbon microtube. FIG. 2b depicts a cutaway view showing approximately one-half of the carbon microtube

DETAILED DESCRIPTION OF THE INVENTION

In all embodiments of the present invention, all ranges are inclusive and combinable. All numerical amounts are understood to be modified by the word "about" unless otherwise specifically indicated. All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

"Carbon microtube," or "microtube," as used herein, means a substantially tubular structure consisting essentially of carbon and having an average diameter in the sub-millimeter range (herein, at least 10 microns).

Figure 2:
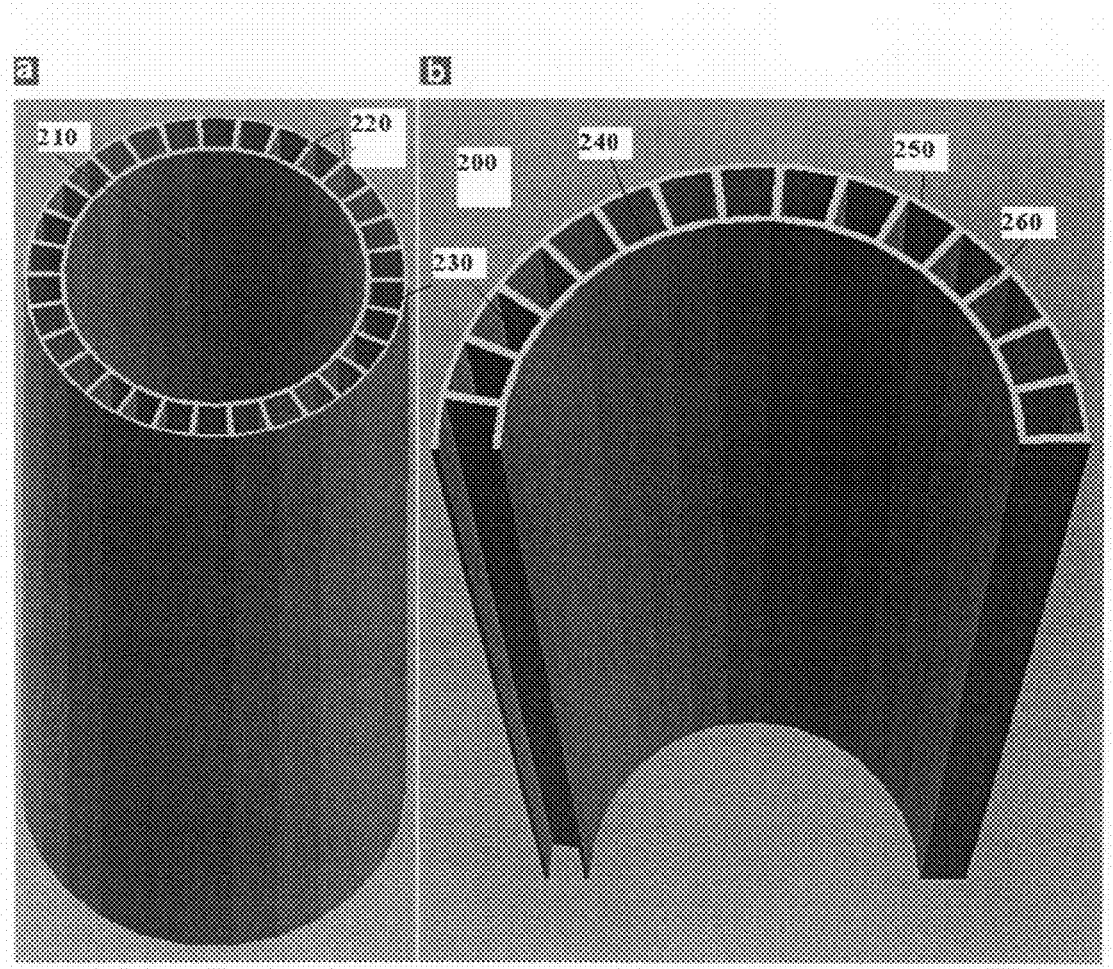
FIG. 2 is a schematic depiction of a carbon microtube of the present invention, showing the rectangular columnar pores, or voids, extending the length of the tube wall.
Figure 3:
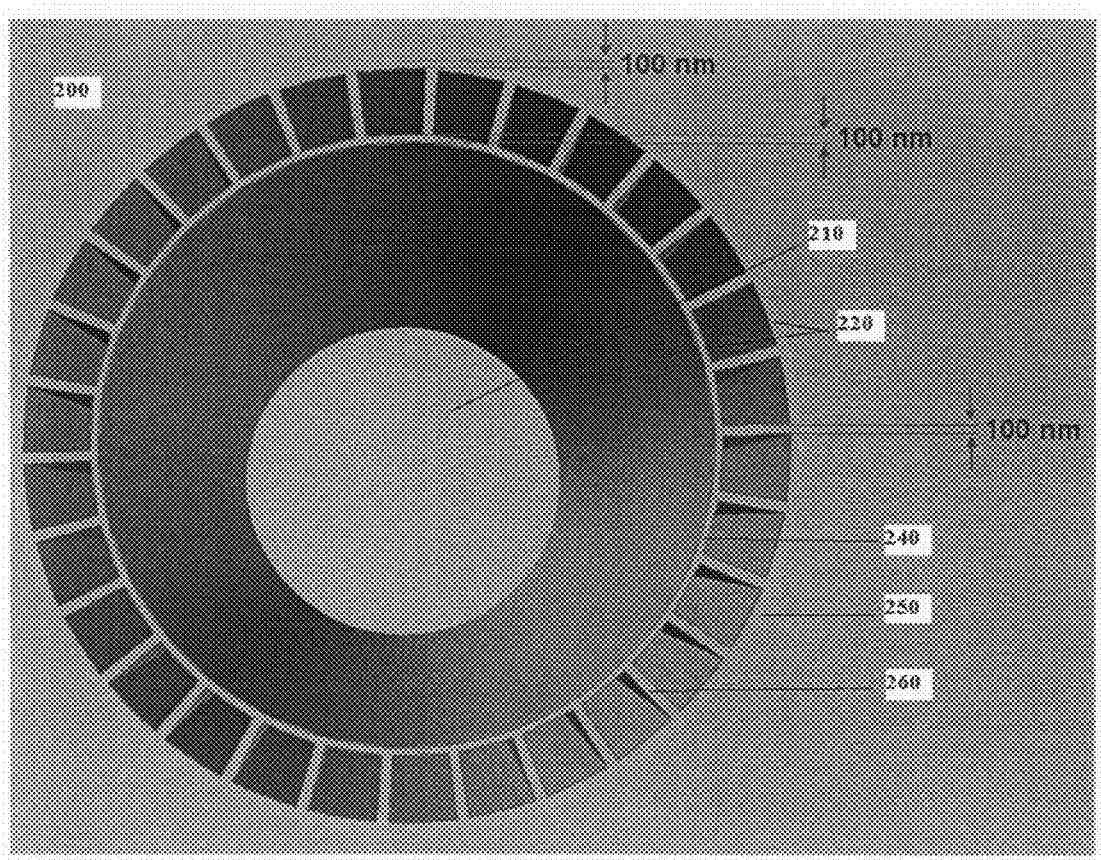
FIG. 3 is a schematic depiction of the carbon microtube of FIG. 1, as viewed along the z-axis (lengthwise).

"Porous wall," as used herein, means that the outer surface(s) of the carbon microtube comprise(s) a plurality of voids, for example, hollow, rectangular-shaped areas which extend in the direction of the length of the tube, as depicted in FIGS. 2 and 3. The term "porous" is not intended to indicate that the structure necessarily has a given permeability for a substance.

"Tensile strength," as used herein, means the rupture stress per unit cross-section area of a carbon microtube fiber subjected to a tensile test. Herein, tensile strength is expressed in units of GPa, or Giga-Pascals.

"Specific strength," as used herein, means the tensile strength per unit of density of the carbon microtube, and is expressed herein in units of centimeters.

"Tenacity," as used herein, means the strength per unit of weight of a carbon microtube fiber. Tenacity is expressed herein in units of g/tex, wherein "tex" means the weight in grams per centimeter of carbon microtube.

"Semiconductor" "semiconducting," or "semiconducting properties," as used herein, means that the fibrous composite exhibits shows semiconductive-like characteristics such as temperature-dependent resistivity.

The carbon microtubes of the present invention are much larger than traditional carbon nanotubes, which typically have an average diameter of 1-1000 nm. The average diameter (measured at the greatest distance between two oppositionally-positioned outermost surfaces) of the microtubes of the present invention is at least 10 µm, or microns. In one embodiment, the average diameter is from about 10 µm to about 150 µm, and alternatively is from about 40 µm to about 100 µm. In one embodiment, the carbon microtubes have a length of at least 1 mm, and alternatively of at least 1 cm.

Surprisingly, the porous walls of the carbon microtubes exhibit a highly ordered lamellar structure, and the wall exhibits a layered graphite crystal structure. As depicted in FIG. 2 and FIG. 3, carbon microtube 200 comprises a hollow, tubular inner space 210 surrounded by porous wall 220. The porous wall comprises a plurality of voids 230, said voids substantially parallel to the central axis of the microtube 200, and defined by an inner surface 240, an outer surface 250, and a shared surface 260, which separates two adjacent voids. The thickness of the shared surface may be from about 10 nm to about 150 nm. The thickness of the porous wall may be from about 0.5 µm to about 2 µm, and alternatively from about 1.0 µm to about 1.5 µm. The porous wall may have a density of from about 50 mg/cm$^3$ to about 150 mg/cm$^3$, and alternatively a density of from about 75 mg/cm$^3$ to about 125 mg/cm$^3$, and alternatively a density of from about 100 mg/cm$^3$ to about 120 mg/cm$^3$. The size of the voids 230 may be substantially similar, or may vary. For example, the width (as measured at two oppositionally-positioned points on adjacent shared surfaces) may vary from about 500 nm to about 2 µm.

The carbon microtubes also exhibit surprising and useful properties. The microtubes have a density of less than 20 mg/cm$^3$, which is comparable to carbon nanofoams. In one embodiment, the density is from about 2 mg/cm$^3$ to about 20 mg/cm$^3$, alternatively is from about 2 mg/cm$^3$ to about 15 mg/cm$^3$, alternatively is from about 2 mg/cm$^3$ to about 10 mg/cm$^3$, alternatively is from about 5 mg/cm$^3$ to about 15 mg/cm$^3$, and alternatively is from about 10 mg/cm$^3$ to about 12 mg/cm$^3$.

In addition, the microtubes possess excellent mechanical and electrical properties. The carbon microtubes of the present invention have a tensile strength of at least 1 GPa, and alternatively a tensile strength of from about 3 to about 10 GPa, and alternatively from about 6 GPa to about 10 GPa, per individual carbon microtube. In comparison, carbon nanotubes, one of the strongest materials known, have been measured to have a tensile strength of approximately up to 65 GPa. However, to exploit this superior property for practical applications, individual carbon nanotubes generally are assembled into macroscopic fibers, which exhibit a tensile strength of less than 3.3 GPa. To determine the tensile strength of the carbon microtubes, a Shimadzu Universal Testing Instrument with a 5 N load cell was used. The test process is similar to that used with carbon nanotube fibers, and is described in X. Zhang et al., Small, vol. 3, pp. 244-248 (2007), with any minor variations being apparent to one of skill in the art. For each measurement, an individual microtube with gauge length of about 5 mm was first mounted on a paper tab and tested under tension at a displacement speed of 0.05 mm/s.

The carbon microtubes of the present invention may have a specific strength of at least $1 \times 10^8$ cm, which results from the combination of high strength and low density. Alternatively, the specific strength may be from about $2 \times 10^8$ cm to about $10 \times 10^8$ cm, and alternatively from about $4 \times 10^8$ cm to about $8 \times 10^8$ cm. The specific strength may be calculated by dividing the tensile strength in GPa by the density in g/cm$^3$, to yield a specific strength in cm.

The carbon microtubes of the present invention may have a tenacity of at least $1 \times 10^3$ g/tex, which is about 30 times that of Kevlar and about 224 times that of individual cotton fibers. Alternatively, the microtubes may have a tenacity of from about $2 \times 10^3$ g/tex to about $10 \times 10^3$ g/tex, and alternatively from about $4 \times 10^3$ g/tex to about $8 \times 10^3$ g/tex. The tenacity may be calculated from the tensile strength measurements by using the conversion factor of 1 g/tex=$10^5$ cm.

The carbon microtubes of the present invention may have an electrical conductivity of at least $10^2$ S/cm at room temperature (298K), as measured on an individual carbon microtube. Alternatively, the carbon microtubes may have an electrical conductivity of from about 100 S/cm to about 2000 S/cm at room temperature, and alternatively from about 1000 S/cm to about 2000 S/cm at room temperature. In one embodiment, the carbon microtube is a semiconducting carbon microtube, which means that the conductivity increases with increased temperature. The conductivity of the carbon microtubes was measured as described in Li et al., Advanced Materials, vol. 19, pp. 3358-3363, the last paragraph of which on p. 3362 is incorporated herein by reference.

EXAMPLES

Figure 1:
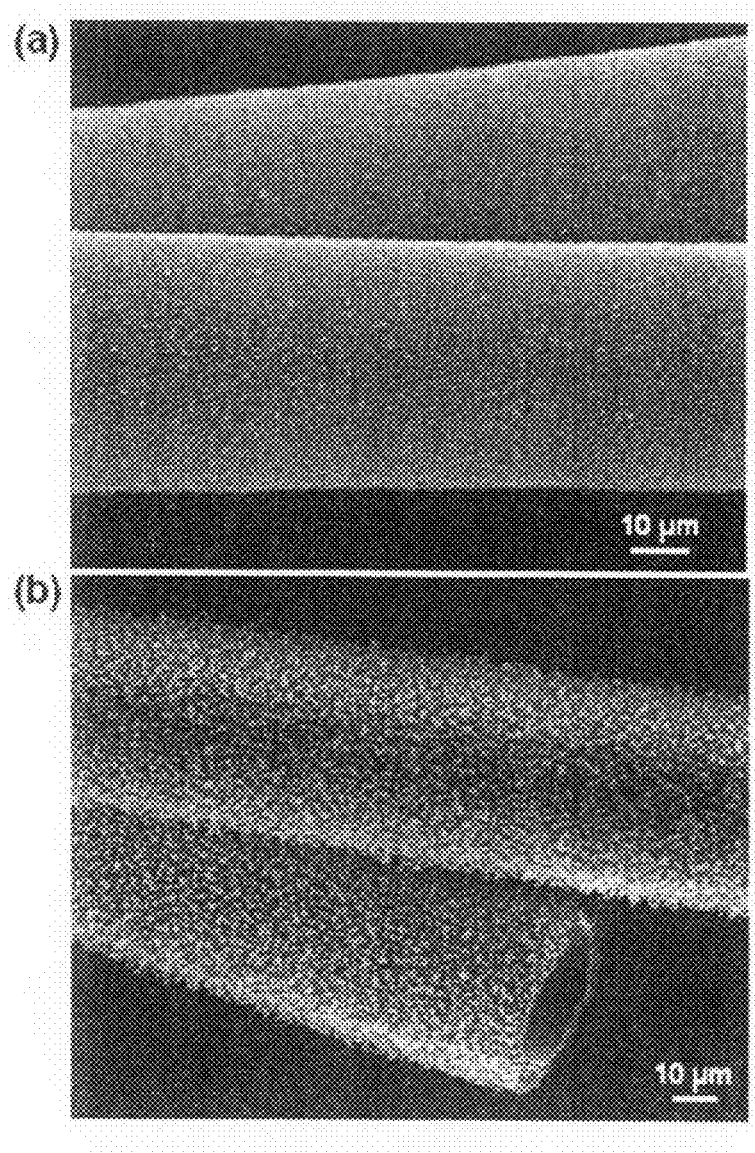
FIG. 1 shows images of carbon microtubes of the present invention, obtained by scanning electron microscropy (SEM).
Figure 4:
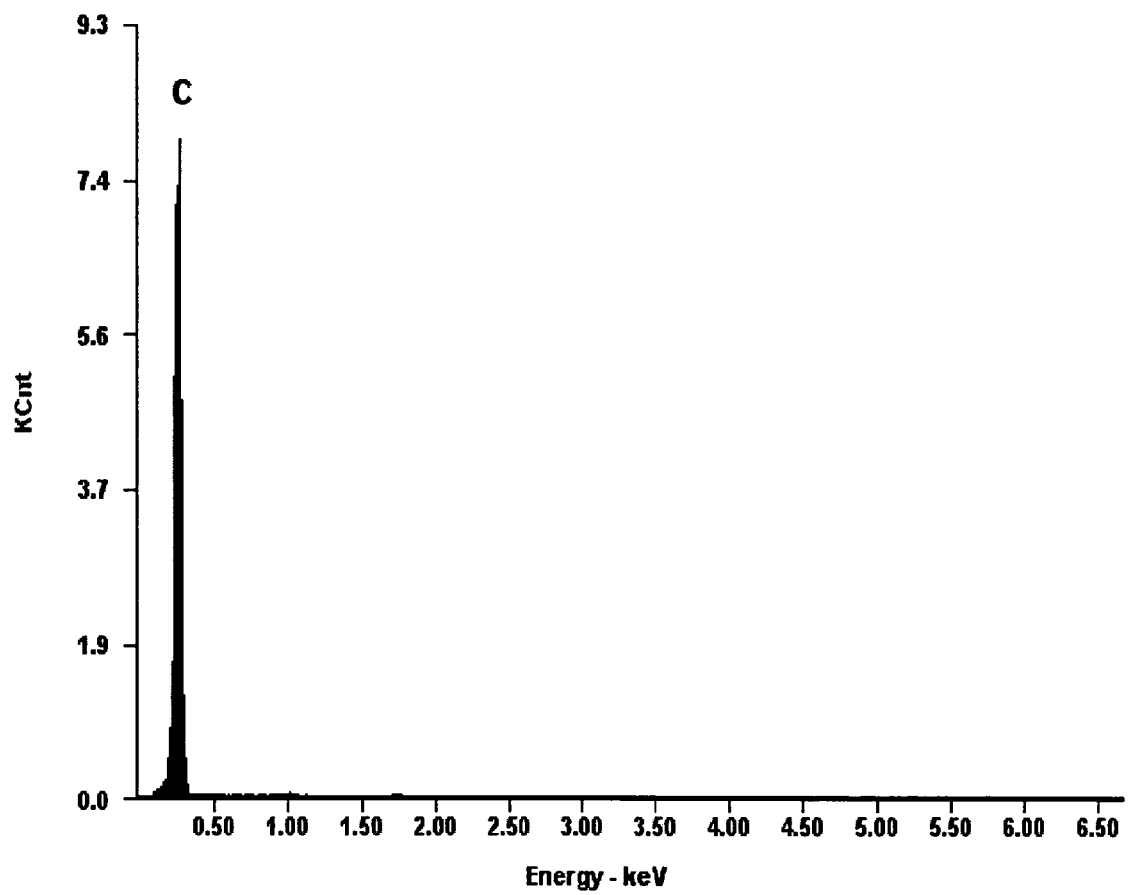
FIG. 4 depicts data obtained from energy-dispersive X-Ray spectroscopy of a carbon microtube of the present invention, showing the elemental composition of the microtube.

Carbon microtubes were synthesized using a chemical vapor deposition (CVD) process. A mixture of ethylene and paraffin oil (with kinematic viscosity of 33.5 centistokes or less at 40° C.) was used as the precursor. Ar with 6% H$_2$ was used to carry the precursor to a 1-inch quartz tube furnace where the growth took place in the temperature range of 750-850° C. The carbon microtube growth was carried out with 80 sccm ethylene and 120 sccm carrier gas in a process similar to that used to synthesize carbon nanotubes, as described in Li, Q. et al. Adv. Mater. 2006, 18, 3160, the only difference being that both ethylene and paraffin oil were used as precursors. No catalyst was used. FIG. 1 depicts scanning electron microscopy (SEM) images of a typical carbon microtube having a diameter of about 50 µm. FIG. 4 shows data obtained from energy-dispersive X-ray spectroscopy, and shows that the carbon microtubes consist essentially of carbon (where "KCnt" means kilo counts and C means carbon).

Whereas particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A carbon microtube comprising a hollow, substantially tubular structure having a porous wall, wherein the microtube has a length, a diameter of from about 10 µm to about 150 µm, and a density of less than 20 mg/cm$^3$, wherein the porous wall comprises a plurality of voids that are substantially parallel to the central axis of the microtube and defined by an inner surface, an outer surface, and a shared surface separating two adjacent voids, each void further characterized as having a rectangular shape and extending parallel to the central axis of the microtube along the length of the microtube wall.

2. The carbon microtube of claim 1, wherein the density is from about 2 mg/cm$^3$ to about 20 mg/cm$^3$.

3. The carbon microtube of claim 1, further having a length of at least 1 mm.

4. The carbon microtube of claim 1, further having an electrical conductivity at room temperature of at least 100 S/cm.

5. The carbon microtube of claim 1, wherein the porous wall has a density of from about 50 mg/cm$^3$ to about 150 mg/cm$^3$.

6. The carbon microtube of claim 1, wherein the thickness of the porous wall is from about 0.5 µm to about 2 µm.

7. The carbon microtube of claim 1, further having a tensile strength of at least 1 GPa.

8. The carbon microtube of claim 1, further having a specific strength of at least $1 \times 10^8$ cm.

9. The carbon microtube of claim 1, further having a tenacity of at least $1 \times 10^3$ g/tex.

10. A carbon microtube comprising a hollow, substantially tubular structure having a porous wall with a length, wherein the porous wall comprises a plurality of voids, said voids substantially parallel to central axis of the microtube and defined by an inner surface, an outer surface, and a shared surface separating two adjacent voids, each void further characterized as having a rectangular shape and extending parallel to the central axis of the microtube along the length of the microtube wall.

11. The carbon microtube of claim 10, wherein the carbon microtube is a semiconductor.

12. The carbon microtube of claim 10, wherein the average diameter of the microtube is from about 10 μm to about 150 μm.

13. The carbon microtube of claim 10, wherein the length of the microtube is greater than 1 mm.

14. The carbon microtube of claim 10, wherein the porous wall has a density of from about 50 mg/cm$^3$ to about 150 mg/cm$^3$.

15. The carbon microtube of claim 10, wherein the thickness of the porous wall is from about 0.5 μm to about 2 μm.

16. The carbon microtube of claim 10, further having a tensile strength of at least 1 GPa.

17. The carbon microtube of claim 10, further having a specific strength of at least $1 \times 10^8$ cm.

18. The carbon microtube of claim 10, further having a tenacity of at least $1 \times 10^3$ g/tex.

19. The carbon microtube of claim 10, further having an electrical conductivity at room temperature of at least 100 S/cm.

* * * * *